US012719715B2

(12) United States Patent
Maung et al.

(10) Patent No.: US 12,719,715 B2
(45) Date of Patent: Aug. 25, 2026

(54) LOW LATENCY SERIAL BUS

(71) Applicant: TEXAS INSTRUMENTS INCORPORATED, Dallas, TX (US)

(72) Inventors: Win Naing Maung, Plano, TX (US); Roy Wojciechowski, Round Rock, TX (US); James Skidmore, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 39 days.

(21) Appl. No.: 18/240,827

(22) Filed: Aug. 31, 2023

(65) Prior Publication Data

US 2024/0356774 A1 Oct. 24, 2024

Related U.S. Application Data

(60) Provisional application No. 63/463,127, filed on May 1, 2023, provisional application No. 63/461,122, filed on Apr. 21, 2023.

(51) Int. Cl.
*H04L 12/40* (2006.01)

(52) U.S. Cl.
CPC .. *H04L 12/40058* (2013.01); *H04L 12/40013* (2013.01); *H04L 12/40071* (2013.01); *H04L 12/40117* (2013.01)

(58) Field of Classification Search
CPC ................ G10K 11/16; G10K 11/1785; H04L 12/40013; H04L 12/40058; H04L 12/40071; H04L 12/40117
See application file for complete search history.

(56) References Cited

U.S. PATENT DOCUMENTS

| | | | | |
|---|---|---|---|---|
| 5,933,430 A * | 8/1999 | Osakabe | H04N 21/43632 375/E7.025 |
| 6,243,395 B1 * | 6/2001 | Fujimori | H04L 12/40058 370/905 |
| 6,477,600 B1 * | 11/2002 | Baxter | G06F 9/4825 710/48 |
| 6,571,228 B1 * | 5/2003 | Wang | G06V 10/56 706/20 |
| 2002/0002407 A1 * | 1/2002 | Takaku | G05B 19/042 700/2 |

(Continued)

OTHER PUBLICATIONS

Bainbridge, Andrew. "What is the minimum latency of USB 3.0—Stack Overflow"; Nov. 13, 2014; https://stackoverflow.com/questions/13831008/what-is-the-minimum-latency-of-usb-3.0 (Year: 2014).*

(Continued)

*Primary Examiner* — Stephen J Clawson
(74) *Attorney, Agent, or Firm* — Xianghui Huang; Frank D. Cimino

(57) ABSTRACT

A serial bus control circuit includes a link layer control circuit. The link layer control circuit is configured to control isochronous data transfer over a serial bus. The link layer control circuit includes an isochronous cycle timer configured to provide a cycle frame that is less than 125 microseconds in duration. The link layer control circuit can be configured to set the isochronous cycle timer to provide a cycle frame duration that produces an isochronous transfer latency of no more than 50 microseconds.

25 Claims, 9 Drawing Sheets

(56) References Cited

U.S. PATENT DOCUMENTS

| | | | | |
|---|---|---|---|---|
| 2003/0041205 | A1* | 2/2003 | Wu | G06F 13/387 710/302 |
| 2006/0262766 | A1* | 11/2006 | Peleg | H04L 43/0829 370/338 |
| 2007/0260779 | A1* | 11/2007 | Mora | H04L 49/901 710/52 |
| 2012/0069855 | A1* | 3/2012 | Zhang | H04L 67/34 370/465 |
| 2016/0085704 | A1* | 3/2016 | Lida | H04L 12/2832 710/106 |
| 2016/0350247 | A1* | 12/2016 | Howard | G06F 13/36 |
| 2016/0353196 | A1* | 12/2016 | Baker | G10K 11/17823 |
| 2019/0074026 | A1* | 3/2019 | Poulsen | G10L 21/055 |
| 2019/0102333 | A1* | 4/2019 | Hundal | G06F 13/1673 |
| 2022/0138134 | A1* | 5/2022 | Nahvi | G06F 13/387 |
| 2023/0125511 | A1* | 4/2023 | Feng | G10K 11/17885 381/71.5 |

OTHER PUBLICATIONS

Apple, et al. “Universal Serial Bus 3.2 Specification” Revision 1.0; Sep. 22, 2017. (Year: 2017).*

* cited by examiner

| MIXED MODE : DUAL LATENCY (BASE AND 2xBASE) EXAMPLES WITH TWO AUDIO ATTRIBUTES | | | | | | | | | | | | |
|---|---|---|---|---|---|---|---|---|---|---|---|---|
| | | | | | | GROUP 1. AUDIO STREAMS WITH BASE LATENCY (ALL CHANNEL, PACKETS SENT EVERY CYCLE) | | | | | | |
| AUDIO NETWORK | CYCLE TIMER (µs) | BASE PROTOCOL LATENCY (µs) | ISO DURATION WITHOUT CYCLE START | MAX SIGNAL LATENCY (µs) | BUS SPEED (Mbps) | SAMPLE BIT WIDTH | NUMBER OF WORD (2 OF I2S) | NUMBER OF BIT PER CHANNEL | PERCENT ALLOCATION OF CHANNELS WITH BASE LATENCY | NUMBER OF CHANNELS USED AT BASE LATENCY | AT LATENCY (µs) | SAMPLING RATE (kHz) |
| A | 25 | 25 | 19.45 | 5 | 400 | 32 | 2 | 64 | 55.42416452 | 28 | 30.0 | 48 |
| B | 50 | 25 | 19.5 | 5 | 800 | 32 | 16 | 512 | 18 | 48 | 30.0 | 96 |
| C | 25 | 25 | 19.45 | 5 | 400 | 32 | 3 | 96 | 17.48071979 | 12 | 30.0 | 48 |
| D | 50 | 25 | 19.35 | 5 | 200 | 32 | 2 | 64 | 45.06459948 | 16 | 30.0 | 48 |
| | | | | | | GROUP 2. AUDIO STREAMS WITH DOUBLE OF BASE LATENCY (HALF OF THE CHANNELS SEND PACKETS DURING ODD CYCLE AND THE OTHER HALF SEND PACKETS DURING EVEN CYCLE) | | | | | | |
| AUDIO NETWORK | CYCLE TIMER (µs) | BASE PROTOCOL LATENCY (µs) | | MAX SIGNAL LATENCY (µs) | BUS SPEED (Mbps) | SAMPLE BIT WIDTH | NUMBER OF WORD (2 OF I2S) | NUMBER OF BIT PER CHANNEL | PERCENT ALLOCATION OF CHANNELS WITH DOUBLE LATENCY | NUMBER OF CHANNELS USED AT DOUBLE LATENCY | AT LATENCY (µs) | SAMPLING RATE (kHz) |
| A | 25 | 25 | | 5 | 400 | 32 | 4 | 128 | 44.57583548 | 64 | 55 | 48 |
| B | 50 | 25 | | 5 | 800 | 32 | 2 | 64 | 82 | 32 | 55 | 48 |
| C | 25 | 25 | | 5 | 400 | 32 | 32 | 128 | 82.51928021 | 128 | 55 | 192 |
| D | 50 | 25 | | 5 | 200 | 32 | 8 | 256 | 54.93540052 | 64 | 55 | 192 |

FIG. 6

| AUDIO NETWORK | CYCLE TIMER (μs) | BASE PROTOCOL LATENCY (μs) | ISO DURATION WITHOUT CYCLE START | MAX SIGNAL LATENCY (μs) | BUS SPEED (Mbps) |
|---|---|---|---|---|---|
| A | 25 | 25 | 19.45 | 5 | 400 |
| B | 50 | 25 | 19.5 | 5 | 800 |
| C | 25 | 25 | 19.45 | 5 | 400 |
| D | 50 | 25 | 19.35 | 5 | 200 |

| SAMPLE BIT WIDTH | NUMBER OF WORD (2 OF I2S) | NUMBER OF POSSIBLE CONCATENATED PACKETS | NUMBER OF BIT PER CHANNEL | PERCENT ALLOCATION OF CHANNELS WITH BASE LATENCY | NUMBER OF CHANNELS USED AT BASE LATENCY | AT LATENCY (μs) | SAMPLING RATE (kHz) | SCK (MHz) | EACH SAMPLE PACKET DURATION (μs) |
|---|---|---|---|---|---|---|---|---|---|
| 32 | 2 | 4 | 64 | 55.42416452 | 28 | 30.0 | 192 | 12.288 | 5.208333333 |
| 32 | 2 | 2 | 64 | 9.384615385 | 6 | 30.0 | 96 | 6.144 | 10.41666667 |
| 32 | 3 | 9 | 96 | 17.48071979 | 12 | 30.0 | 384 | 36.864 | 2.604166667 |
| 32 | 2 | 1 | 64 | 45.06459948 | 16 | 30.0 | 48 | 3.072 | 20.83333333 |

PACKET CONCATENATION TO SUPPORT HIGHER SAMPLE RATE WHERE THE PACKET DURATION IS LESS THAN THE CYCLE DURATION, MULTIPLE SAMPLE PACKETS WILL BE CONCATENATED TO BE SENT IN THE SAME CYCLE. THIS WILL EXTEND THE LATENCY OF THE PACKET BUT THE BUS WILL SUPPORT HIGHER SAMPLE RATE

FIG. 7

LOW LATENCY SERIAL BUS

CROSS-REFERENCE TO RELATED APPLICATIONS

This application claims priority to U.S. Provisional Application No. 63/461,122, filed Apr. 21, 2023, entitled "Enhancement to IEEE 1394 to meet latency requirements to support active noise cancellation application," and U.S. Provisional Application No. 63/463,127, filed May 1, 2023, entitled "Enhancement to IEEE 1394 to meet latency requirements to support active noise cancellation application," which are hereby incorporated by reference.

BACKGROUND

Active noise cancellation (ANC) uses microphones to detect unwanted ambient noise and generates a cancellation signal that is out of phase with ambient noise signal. When the unwanted noise signal and the cancellation signal meet in the air, the amplitude of the unwanted noise signal is reduced (the unwanted noise signal is cancelled). Some active noise cancellation systems may transfer data between systems nodes (e.g., from a microphone to a cancellation signal generation circuit to a speaker, etc.) using a serial bus that supports isochronous data transfer. Isochronous data transfer is useful for communication of audio data because it provides transfer with a specific data rate and latency.

SUMMARY

In one example, a serial bus control circuit includes a link layer control circuit. The link layer control circuit is configured to control isochronous data transfer over a serial bus. The link layer control circuit includes an isochronous cycle timer configured to provide a cycle frame that is less than 125 microseconds in duration.

In another example, a method for isochronous communication includes setting an isochronous cycle timer to provide a cycle frame that is no more than 50 microseconds in duration. The method also includes generating an isochronous packet, and transmitting the isochronous packet in the cycle frame.

In a further example, an active noise cancellation (ANC) system includes a microphone, a speaker, and an ANC controller. The ANC controller is coupled to the microphone and the speaker by a serial bus. The ANC controller includes a link layer control circuit configured to control isochronous data transfer between the ANC controller, the microphone, and the speaker over the serial bus. The link layer control circuit includes an isochronous cycle timer configured to provide a cycle frame that is less than 125 microseconds in duration.

BRIEF DESCRIPTION OF THE DRAWINGS

FIG. 6 is a table of example channel count and latency values for mixed latency audio streams using the serial bus components of FIG. 2 in the ANC system of FIG. 1.

FIG. 7 is a table of example network configurations illustrating use of packet concatenation using the serial bus components of FIG. 2 in the ANC system of FIG. 1.

DETAILED DESCRIPTION

Figure 1:
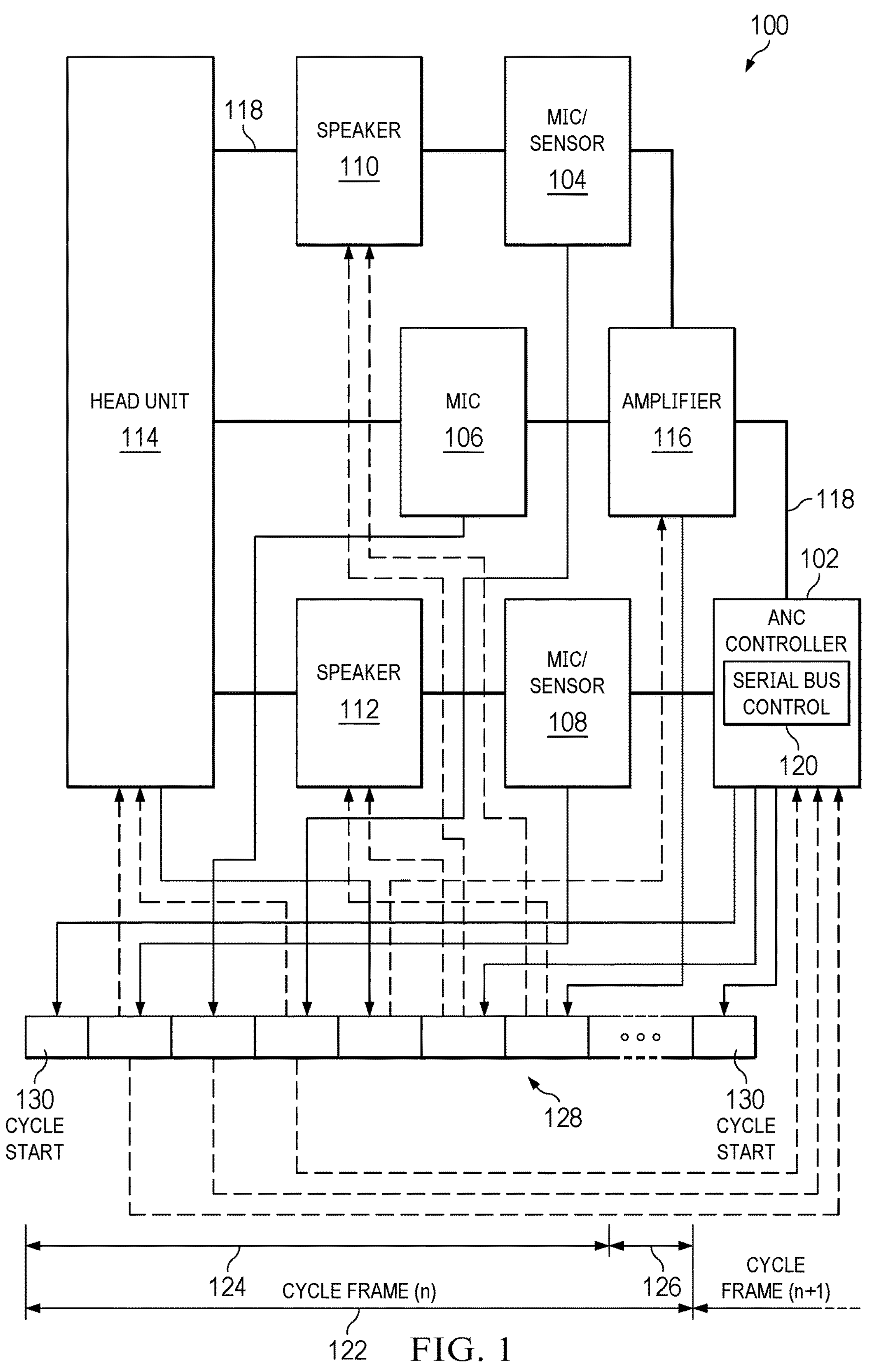
FIG. 1 is a block diagram of an example active noise cancellation (ANC) system that includes serial bus communication.

FIG. 1 is a block diagram of an example active noise cancellation (ANC) system 100. The ANC system 100 includes an ANC controller 102, microphones 104, 106, and 108, speakers 110 and 112, a head unit 114, and an amplifier 116 that communicate via a serial bus 118. The serial bus 118 may include cables that interconnect the ANC system nodes (e.g., the ANC controller 102, the microphone 104, the speaker 110, etc.).

The microphones 104, 106, and 108 detect and capture audio signals, digitize the captured audio signals, and transfer the digitized audio signals to the ANC controller 102 via the serial bus 118. The ANC controller 102 processes the digitized audio signals to generate a noise cancellation signal. The ANC controller 102 transfers the noise cancellation signal to the speakers 110 and 112 via the serial bus 118. The ANC controller 102 may provide the noise cancellation signal to the speakers 110 and 112 in digital or analog form in various examples. The speakers 110 and 112 convert the noise cancellation signal to audio to reduce the amplitude of the audio signals detected by the microphones 104, 106, and 108. In some examples, the head unit 114 generates various audio information (e.g., music, voice, etc.) that is transferred to the amplifier 116 via the serial bus 118, and amplified audio information is transferred to the speakers 110 and 112 via the serial bus 118. The audio information may also be transferred to the ANC controller 102 for use in generating the noise cancellation signal. For example, the ANC controller 102 may generate a noise cancellation signal that reduces the amplitude of the audio signals captured by the microphones 104, 106, and 108, but does not reduce the amplitude of the audio information generated by the head unit 114 and output by the speakers 110 and 112.

The ANC controller 102 includes a serial bus control circuit 120 that transmits the cancellation signal via the serial bus 118 and receives the digitized audio signals via the serial bus 118. Each of the microphones 104, 106, and 108, speakers 110 and 112, head unit 114, and amplifier 116 may also include an example of the serial bus control circuit 120 to enable communication via the serial bus 118. The serial bus 118 supports isochronous transfer of the various audio data types provided in the ANC system 100. Isochronous transfer ensures a specified data rate and latency. FIG. 1 shows a cycle frame 122 of the ANC system 100. The cycle frame 122 include an isochronous portion 124, and an asynchronous portion 126. The isochronous portion 124 may occupy, for example, 80% of the cycle frame 122, and the asynchronous portion 126 may occupy the remainder of the cycle frame 122. The various components (also referred to as nodes) of the ANC system 100 transmit audio data in the isochronous portion 124 of the cycle frame 122. Inset 128 shows examples of the various audio data packets transmitted by the components of the ANC system 100 in the isochronous portion 124 of the cycle frame 122. For example, the cycle frame 122 may include audio signals transmitted by the microphones 104, 106 and 108, and noise cancellation signal transmitted by the ANC controller 102. In various implementations, the ANC controller 102 may transmit the noise cancellation signal derived from audio signals received in a given cycle frame in the same or a subsequent cycle frame as the audio signals.

Latency in the communication of audio data between components of the ANC system 100 is determined, in large part, by the duration of the cycle frame 122. In order for the ANC system 100 to operate effectively (e.g., reduce the amplitude of ambient noise), the latency of audio data transfer should be relatively low (e.g., no more than 50 microseconds (μs)). Some serial bus standards support isochronous transfer of audio data (e.g., IEEE 1394), but limit the cycle frame 122 to a minimum duration that exceeds 50 μs (e.g., 125 us minimum cycle frame duration in IEEE 1394), making use of the serial bus infeasible in the ANC system 100.

The serial bus control circuit 120 controls the duration of the cycle frame 122. At the start of each cycle frame 122, the serial bus control circuit 120 transmits a cycle start packet 130. Time between two successive cycle start packets 130 defines the duration of the cycle frame 122. Examples of the serial bus control circuit 120 can generate cycle start packets 130 with timing that produces a cycle frame 122 having a duration suitable for active noise cancellation. For example, the serial bus control circuit 120 may provide the cycle frame 122 with a duration of 50 μs, 25 μs, 20 μs, 10 μs, or other value suitable for transfer of audio data for active noise cancellation.

The cycle start packet 130 includes a CYCLE_TIME field that specifies the time at which the cycle start packet 130 is transmitted. As the cycle start packet 130 propagates along the serial bus 118, the cycle start packet 130 may be repeated by the serial bus control circuit 120 of a component of the ANC system 100. The repeating delays the cycle start packet 130. To simplify the determination of cycle start time in each component, each component of the ANC system 100 repeating the cycle start packet 130 may update the CYCLE_TIME field to account for repeater delay.

To provide efficient use of serial bus 118 bandwidth, the serial bus control circuit 120 may format isochronous data packets using a header that is substantially smaller than is used in other serial bus standards. For example, the serial bus control circuit 120 may use an eight-byte isochronous packet header, while an IEC 61883-6 AV formatted isochronous packet uses a twenty-byte header.

The ANC system 100 may include audio nodes that sample at different rates and with different sample sizes. With latency a function of sample rate, the ANC system 100 may sub-divide the data packets transmitted by the various components into groups based on latency. For example, a first set of packets with small latency may be transmitted in every cycle frame 122, and a second set of packets with longer latency may transmitted in every other cycle frame 122 (e.g., odd or even indexed cycle frames 122). Accordingly, the ANC system 100 can support mixed latency audio streams, and allocate the bandwidth of the serial bus 118 based on component latency requirements.

Some examples of the ANC system 100 may include audio nodes that sample at rates that exceed the frequency of the cycle start packet 130. In such systems, the serial bus control circuit 120 can concatenate multiple packets for transmission in a cycle frame 122. As long as the ANC latency requirements are met, the concatenation enables use of the higher sample rate components. The number of packets concatenated may be determined as the duration of the cycle frame 122 divided by the sampling interval of an audio node.

Figure 2:
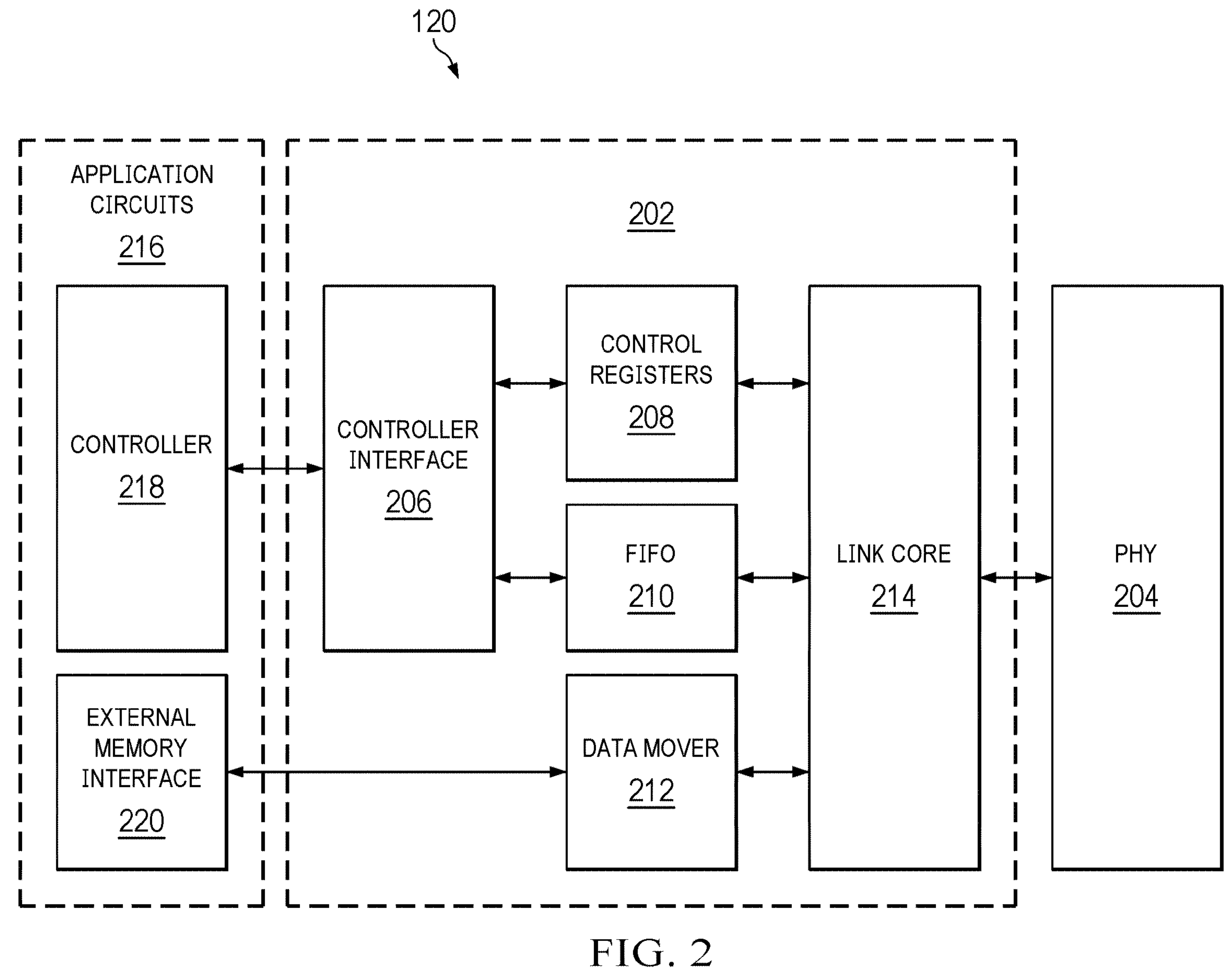
FIG. 2 is a block diagram of example serial bus components suitable for use in the ANC system of FIG. 1.

FIG. 2 is a block diagram of an example of the serial bus control circuit 120. The serial bus control circuit 120 includes a link layer control circuit 202, and a physical layer control circuit 204. The link layer control circuit 202 is coupled to the physical layer control circuit 204 and to applications circuits 216 that use the serial bus control circuit 120 to communicate via the serial bus 118. The physical layer control circuit 204 manages physical access to the serial bus 118, and the link layer control circuit 202 transfers data between the applications circuits 216 and the physical layer control circuit 204. The link layer control circuit 202 includes a controller interface 206, control registers 208, FIFOs 210, a data mover 212, and a link core circuit 214. The controller interface 206 allows an external controller 218 (e.g., a microprocessor, a microcontroller, etc.) to communicate (read or write) with the control registers 208 and the FIFOs 210. For example, the external controller 218 can write to the control registers 208 (via the controller interface 206) to configure operation of the link layer control circuit 202, write data to be transmitted to the FIFOs 210 via the controller interface 206, or read received data from the FIFOs 210.

The control registers 208 include various registers with fields for control values that specify the operational parameters of the link layer control circuit 202. For example, the control registers 208 may include registers that configure operation of the data mover 212 and the link core circuit 214, control generation of interrupts in the controller interface 206, define packet header values, provide status information to the applications circuits 216, etc.

The FIFOs 210 may include transmit and receive FIFOs for storage of data received from the external controller 218 for transmission via the serial bus 118, and storage of data received via the serial bus 118 for access by the external controller 218.

The data mover 212 moves data between the link core circuit 214 and an external memory interface 220 of the applications circuits 216. The data mover 212 may transfer data from the external memory interface 220 for isochronous or asynchronous packet transmission, and may transfer data received in isochronous or asynchronous packets via the serial bus 118 to the external memory interface 220.

Figure 3:
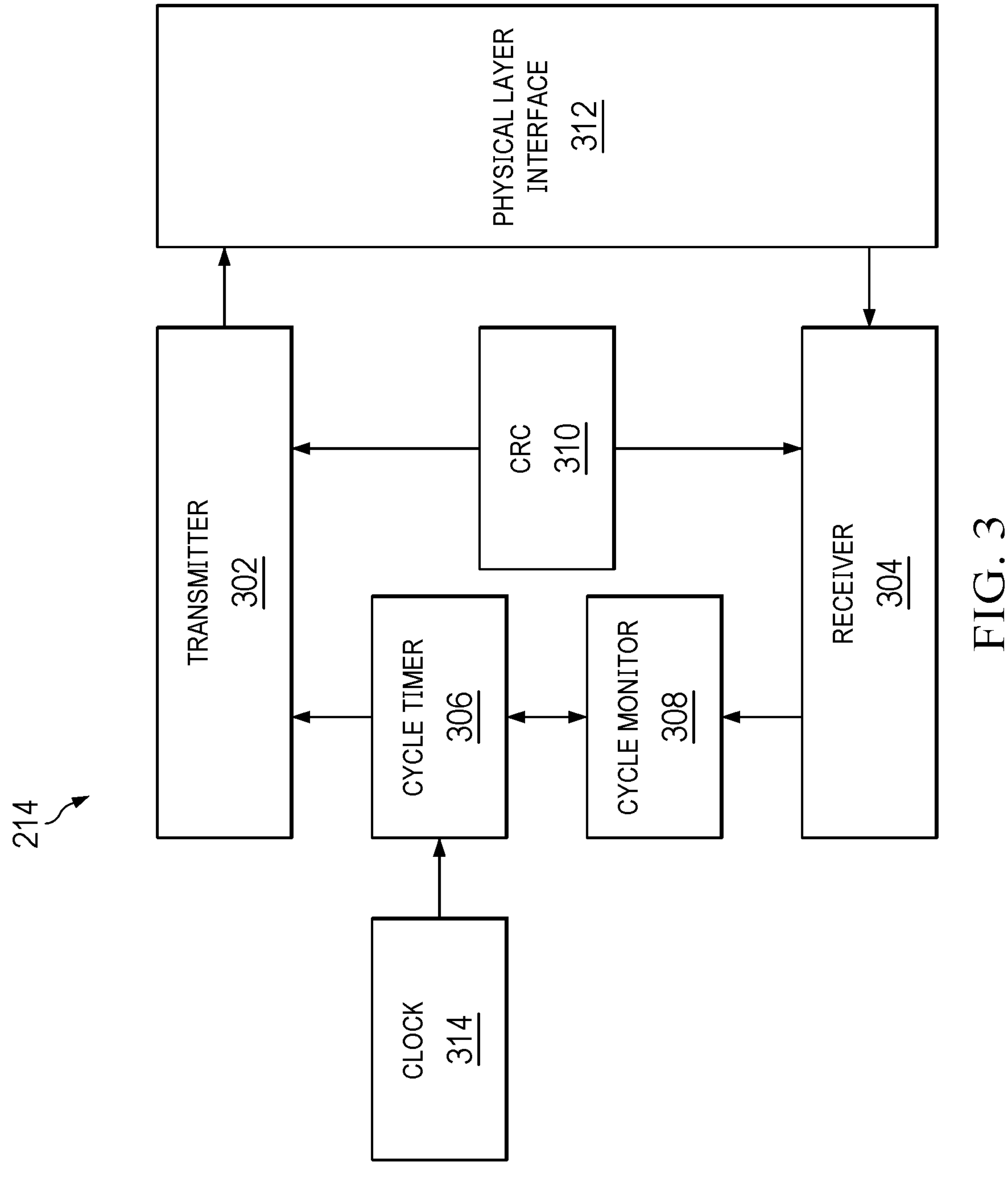
FIG. 3 is a block diagram of an example link layer control circuit with an isochronous cycle timer configured to generate an isochronous cycle frame suitable for use in the ANC system of FIG. 1.

The link core circuit 214 transmits data received from the FIFOs 210 or the data mover 212. The link core circuit 214 receives data from the physical layer control circuit 204 and transfers received data to the FIFOs 210 or the data mover 212. The link core circuit 214 also controls cycle time duration and generation of the cycle start packet 130. FIG. 3 is a block diagram of an example link core circuit 214. The link core circuit 214 includes a transmitter 302, a receiver 304, an isochronous cycle timer 306, a cycle monitor 308, cyclic redundancy check (CRC) circuit 310, and a physical layer interface circuit 312.

The transmitter 302 retrieves data from either the FIFOs 210 or the data mover 212 and generates packets to be transmitted through the physical layer interface circuit 312. The CRC circuit 310 may compute CRC values for the header and data of a packet to be transmitted or a received packet. When data is present in the FIFOs 210, the physical layer interface circuit 312 arbitrates for the serial bus 118 and the transmitter 302 sends an asynchronous packet. When data is present in the data mover 212, the transmitter 302 prepares an isochronous packet for transmission in an upcoming cycle frame. The transmitter 302 autonomously sends the cycle start packet 130 if the link layer control circuit 202 is a cycle master (e.g., in the ANC controller 102).

The receiver 304 receives incoming data from the physical layer interface circuit 312 and determines whether the incoming data is addressed to the node including the serial bus control circuit 120. If the incoming packet is addressed to the node, then the CRC circuit 310 may check the CRC of the packet (header and data CRCs). If the header CRC is valid, confirmation of the header may be written to the FIFOs 210. For asynchronous stream packets and isochronous packets, the remainder of the packet may be confirmed. The receiver 304 may store a status value in the FIFOs 210 after the packet is confirmed. The status value may include an error code for the packet.

In the case of asynchronous packets, the error code may be the acknowledge code that is sent (returned) for that packet. For isochronous and broadcast packets that do not need acknowledge packets, the error code may be the acknowledge code that would have been sent. This acknowledge code informs the applications circuits 216 as to the status of the data CRC. If the header CRC is invalid, the header may be discarded, and the remainder of the packet may be ignored. When a cycle start packet is received, the cycle start packet data is sent to the isochronous cycle timer 306. Cycle start packets are not stored in the FIFOs 210.

The isochronous cycle timer 306 may include a 32-bit isochronous cycle-timer register. The cycle-timer register may be accessible via the control registers 208. The low-order 12 bits of the isochronous cycle timer 306 may include a modulo 3072 counter. In some implementations of the link core circuit 214, the counter is incremented by a 24.576-MHz clock signal to produce a 125 μs cycle. In other implementations of the link core circuit 214, the counter is incremented at higher frequency clock provided by the clock circuit 314, which is coupled to the isochronous cycle timer 306. For example, the counter may be incremented by a 122.880 MHz clock signal provided by the clock circuit 314 to produce a 25 μs cycle, or by a 147.456 MHz clock signal provided by the clock circuit 314 to produce a 20.83 μs cycle. In some examples of the link core circuit 214, the clock circuit 314 may generate a different clock frequency or the divider value applied in the 12-bit counter of the isochronous cycle timer 306 may be different to produce a 50 μs cycle time, or another cycle time lower than 50 μs (e.g., 20 μs, 10 μs, etc.). In some implementations of the isochronous cycle timer 306, the divider value and/or the frequency of the clock signal provided by the clock circuit 314 are programmable via software or other programming method. The next 13 higher-order bits of the isochronous cycle timer 306 are a count of cycles, and the highest 7 bits are a count of cycles/8000 (e.g., 8000 cycles generated by the low-order 12 bits of the isochronous cycle timer 306). The cycle timer contains the cycle-timer register. The cycle-timer register includes three fields: cycle offset, cycle count, and cycles/8000 count. By providing a cycle time of 50 μs or lower, the isochronous cycle timer 306 enables ANC.

The link layer control circuit 202 may operate as a cycle master or as a non-master. If the link layer control circuit 202 is operating as a cycle master, the transmitter 302 transmits a cycle start packet 130 each cycle (e.g., each expiration of the modulo 3072 counter). If the link layer control circuit 202 is operating as a non-master, the isochronous cycle timer 306 is updated by the reception of the cycle start packet 130 transmitted by the cycle master. The cycle offset field in the cycle start packet 130 is used by the cycle-master to keep all nodes in phase and running with a nominal desired isochronous cycle time (e.g., 125 μs, 25 μs, etc.).

The cycle monitor 308 monitors serial bus control circuit 120 activity and schedules isochronous activity. When a cycle start packet 130 is received or sent, the cycle monitor 308 may set a cycle started interrupt bit to notify the external controller 218. The cycle monitor 308 also detects missing cycle start packets and may set a cycle-lost interrupt bit when a cycle start packet 130 is missed. When an isochronous cycle is complete, the cycle monitor 308 may set a cycle-done-interrupt bit. The cycle monitor instructs the transmitter 302 to send a cycle start packet 130 when the link layer control circuit 202 is operating as a cycle master.

Table 1 below shows example bandwidth requirements to support various types of audio packets with a 25 μs cycle frame 122 and the packet format of FIG. 5. In some examples of the ANC system 100, audio may be sampled at a multiple of 48 KHz. Using a 25 μs cycle frame 122, for example, can support creation of a cycle master clock rate of 48 KHz that can be recovered to use as a sampling clock for an audio device. Use of a higher clock frequency to increment the isochronous cycle timer 306 (e.g., 147.456 MHz versus 24.576 MHZ) improves cycle time and time stamp quantization by a factor of 6, from ~40.69 nanoseconds (ns) to ~6.782 ns and reduces the RMS jitter of a recovered 48 KHz clock.

TABLE 1

| # of ch. | # of bits | Sample rate (kHz) | Payload data rate requirement (Mbps) | Total bandwidth requirement (Mbps) | 1394 speed |
|---|---|---|---|---|---|
| 34 | 32 | 384 | 455 | 506 | s800 |
| 112 | 32 | 96 | 354 | 394 | s400 |
| 63 | 32 | 48 | 102 | 115 | s200 |
| 36 | 32 | 48 | 60 | 68 | s100 |

In IEEE 1394, each component coupled to the bus updates CYCLE_TIME in a 32 bit field (7 bit of second+13 bit of cycle count+12 bit of cycle offset). Cycle offset is updated on each cycle of a local 24.576 MHz clock. The cycle master node sends this 32-bit register in the cycle start packet 130 every cycle start time as determined by a 125 μs cycle timer to synchronize with all other nodes on the network. But when a data transfer is already in progress (the serial bus is in use), cycle start packet transmission will be delayed from the cycle start time. In this situation, the cycle master will encode the amount of delay into the CYCLE_TIME field in the cycle start packet so all the other nodes will be able to adjust the cycle start time.

IEEE 1394 does not explicitly define PHY repeater delay. When the cycle start packet 130 is repeated through a repeater of an intermediate PHY 240, the cycle start packet 130 is delayed. The delay between a transmitting node and a receiving node for a cycle start packet 130 varies depending on the number of PHY repeaters the cycle start packet 130 passes through. Depending on the topology and location of the receiver, there will be variable cycle start transport delay. IEEE 1394 uses a bus manager with knowledge of the topology to determine the delay time of the cycle start packet based on the number of repeaters and reading a delay value for a remote PHY. This requires a software solution that adds complexity to the ANC system 100.

To reduce the complexity of software overhead in the ANC system 100, the physical layer control circuit 204 includes repeater circuitry that adjusts the CYCLE_TIME cycle offset field in the cycle start packet 130 that it is repeating. With the isochronous cycle timer 306 incremented at a clock rate of e.g., 147.456 MHZ, the CYCLE_TIME field resolution is ~6.782 ns. In some examples, the repeater PHY may add a value of 21 to the CYCLE_TIME cycle offset field in the cycle start packet to indicate 142 ns PHY repeater delay. Various examples of the physical layer control circuit 204 may add a different repeater delay value to the cycle offset field in accordance with delay added by the repeater functionality of the physical layer control circuit 204. This update allows the nodes of the ANC system 100 to calculate the cycle time and sync local CYCLE_TIME using the CYCLE_TIME information from the cycle start packet 130 without knowledge of the bus topology.

Figure 4A:
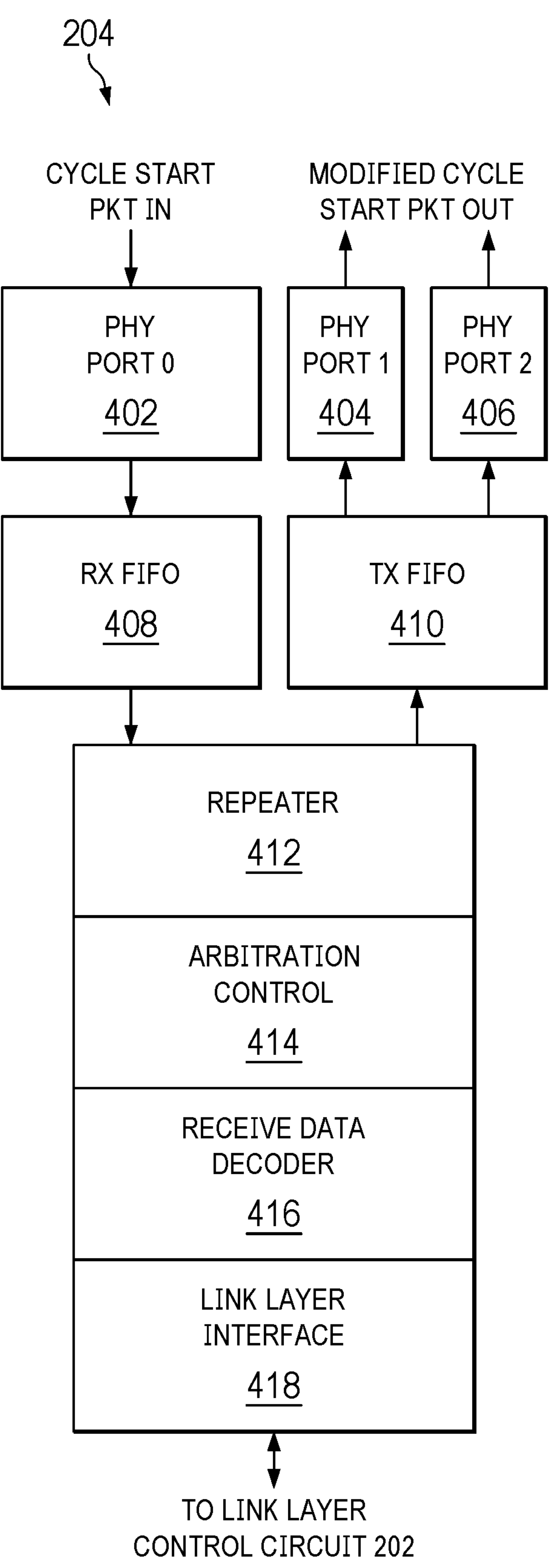
FIG. 4A is a block diagram of an example physical layer control (PHY) circuit suitable for use in the ANC system of FIG. 1.

FIG. 4A is a block diagram of the physical layer control circuit 204. The physical layer control circuit 204 includes ports 402, 404, and 406, a receive FIFO 408, a transmit FIFO 410, a repeater circuit 412, an arbitration control circuit 414, a receive data decoder circuit 416, and a link layer interface circuit 418. The ports 402, 404, and 406 include receiver and transmitter circuitry for communicating via the serial bus 118. In the physical layer control circuit 204, as shown in FIG. 4A, the port 402 receives the cycle start packet 130, and the port 404 and port 406 transmit a modified version of the cycle start packet 130. The receive FIFO 408 is coupled to the port 402, and the transmit FIFO 410 is coupled to the port 404 and the port 406. The port 402 stores a received cycle start packet 130 in the receive FIFO 408, and the port 404 and port 406 retrieve the modified cycle start packet 130 from the transmit FIFO 410 and transmit the modified cycle start packet 130.

Figure 4B:
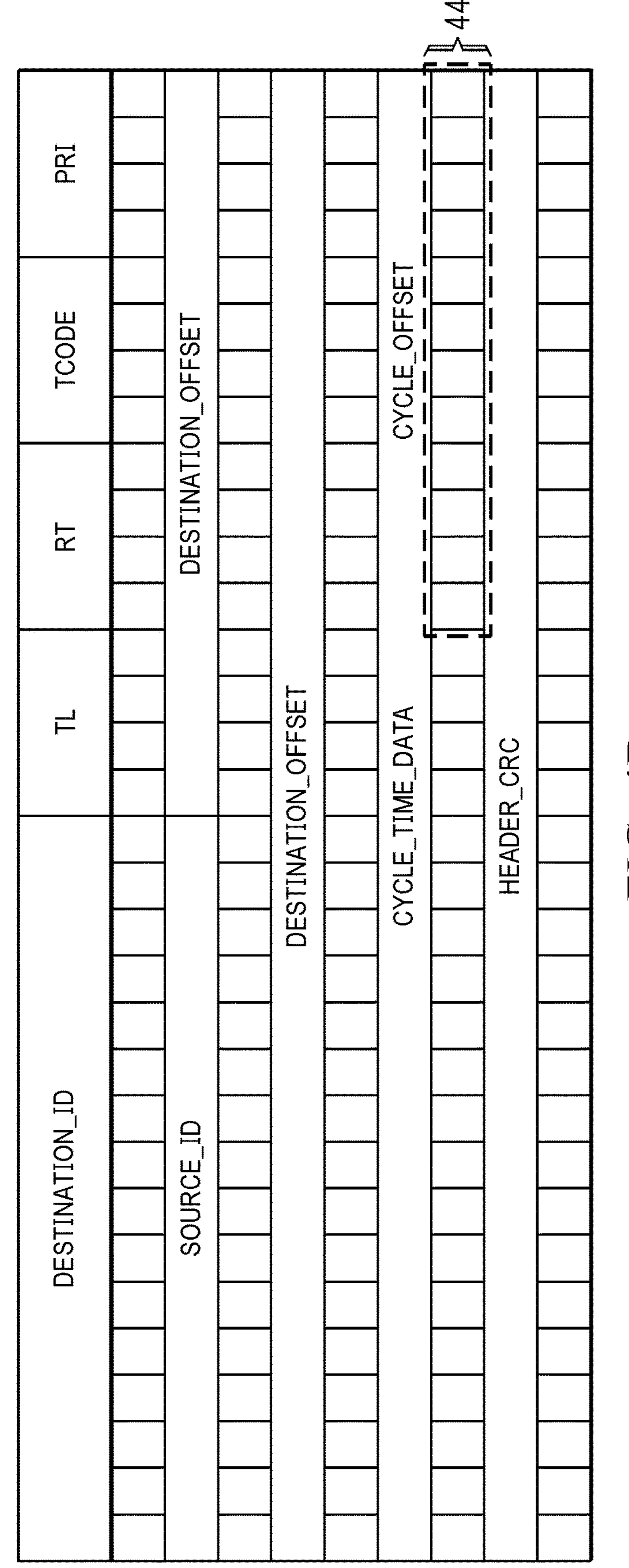
FIG. 4B is a diagram of a cycle start packet suitable for use in the ANC system of FIG. 1.

The repeater circuit 412 is coupled to the receive FIFO 408 and the transmit FIFO 410. The cycle start packet 130 stored in the receive FIFO 408 is transferred to the repeater circuit 412. The repeater circuit 412 includes circuitry to increase the value of the cycle offset field of the cycle start packet 130 by a value corresponding to the time that the cycle start packet 130 is delayed passing through the physical layer control circuit 204 (e.g., from the port 402 to the port 404 and/or the port 406). For example, the repeater circuit 412 may include an adder that adds a constant value (e.g., 21) corresponding to the physical layer control circuit 204 repeater delay to the cycle offset field of the cycle start packet 130. The repeater circuit 412 transfers the modified cycle start packet 130, which includes the updated cycle offset field value, to the transmit FIFO 410 for transmission. FIG. 4B is a diagram of a cycle start packet 130 showing the 12-bit cycle offset field 440 that is updated by the repeater circuit 412.

The arbitration control circuit 414 controls arbitration for the right to transmit. For example, the arbitration control circuit 414 may arbitrate according to priority and/or guaranteed channel time methods of the IEEE 1394 specification.

The receive data decoder circuit 416 analyzes the data of a received packet to determine whether the packet is to be passed to the link layer control circuit 202. For example, the receive data decoder circuit 416 compares the destination ID of the received packet to the ID of the receiving node. If the destination ID is the same as the ID of the receiving node, then the physical layer control circuit 204 may pass the packet (or data extracted from the packet) to the link layer control circuit 202.

The link layer interface circuit 418 includes circuitry for receiving data output by the link layer control circuit 202 and for passing data to the link layer control circuit 202.

Figure 5:
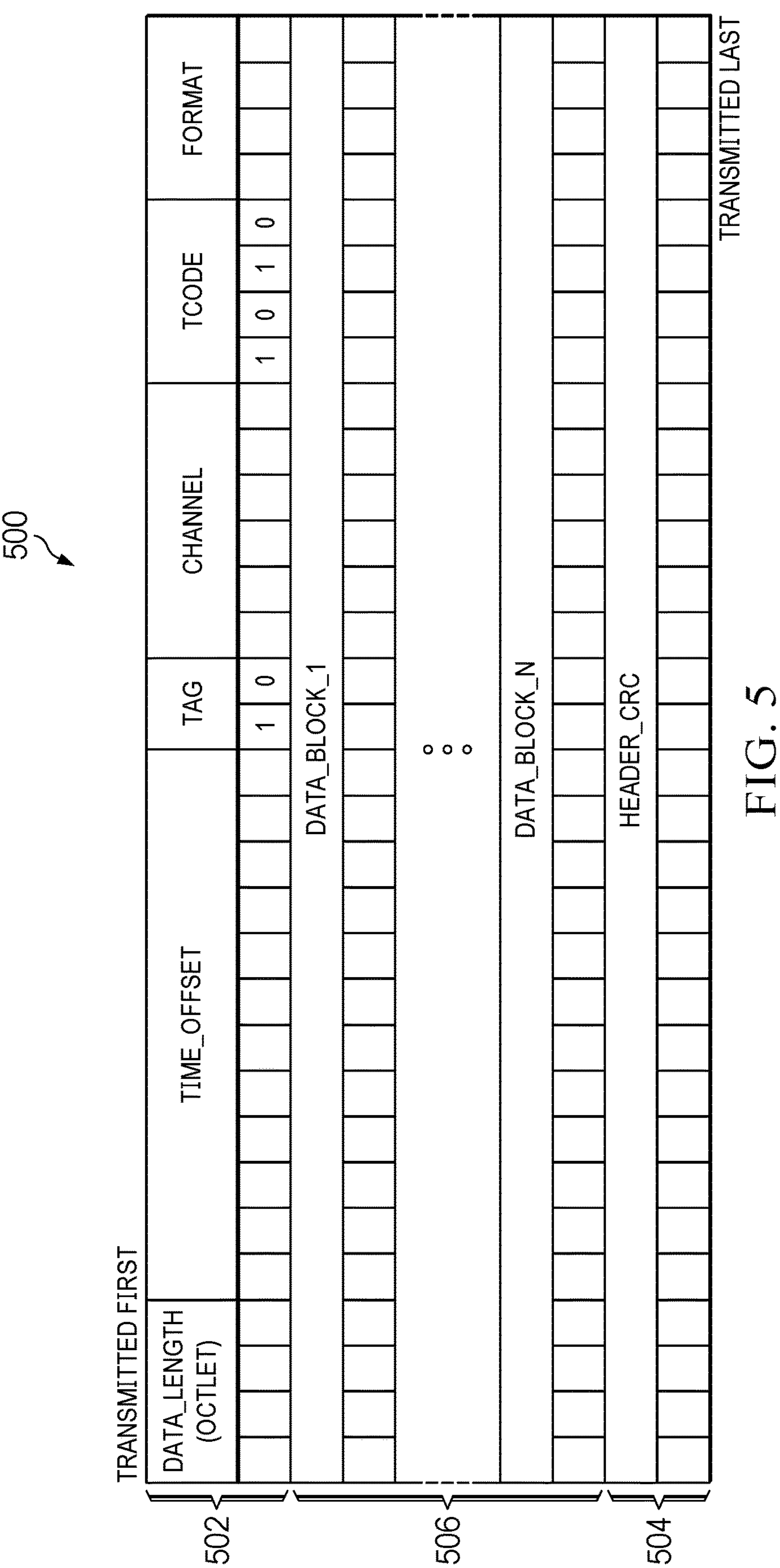
FIG. 5 is diagram of a data packet with a header suitable for use in isochronous data packets generated by the serial bus components of FIG. 2.

FIG. 5 is diagram of an isochronous data packet 500 suitable for use in the ANC system 100. An isochronous data packet formatted in accordance with the International Electrotechnical Commission (IEC) 61883-6 protocol includes 20 bytes of header and CRC information, in addition to payload. For a small payload, e.g., 8 bytes, this header to data ratio is very inefficient. To provide improved efficiency, the header 502 of the isochronous data packet 500 includes only four bytes. The header CRC field 504 also includes four bytes. The CRC value provided in the header CRC field 504 may validate both the header 502 and the payload 506. In the isochronous data packet 500, for a small packet with eight bytes of payload, the header to data ratio is 1 which improves bus bandwidth efficiency by a factor of 2.5 relative to IEC 61883-6. The isochronous data packet 500 may be constructed by the transmitter 302 based on header data retrieved from the control registers 208 and payload data retrieved from the FIFOs 210 or the data mover 212.

The header 502 includes a data length field, a time offset field, a tag field, a channel field, a tcode field, and a format field. The tag field includes the code '10' to indicate a new compact packet format. The data length field specifies the payload size in octets instead of bytes to reduce the field to 4 bits. The 4-bit data length field allows for a payload 506 having a minimum of 8 bytes and a maximum of 128 bytes. The 12-bit time offset field specifies the packet location offset with respect to the cycle start packet 130 (the offset resolution will be the same as the CYCLE_TIME cycle offset). The 4-bit tcode field may specify an IEEE 1394 transaction code. The 4-bit format field specifies the payload format (e.g., I2S, TDM4 etc.).

To further optimize bandwidth utilization, the serial bus control circuit 120 may allocate bandwidth of the serial bus 118 based on the latency requirements of the nodes transmitting and receiving isochronous data packets. Examples of the serial bus control circuit 120 may support single or dual latency. In the serial bus control circuit 120, the isochronous packet latency is set based on the isochronous cycle timer 306. Table 2 shows example channel count and latency values provided using the isochronous cycle timer 306 and the isochronous data packet 500 in an example of the ANC system 100.

TABLE 2

| cycle timer (us) | base protocol latency (us) | max signal latency (us) | bus speed (Mbps) | sample bit width | # of word (2 for I2S) | # of bit per channel |
|---|---|---|---|---|---|---|
| 25 | 25 | 5 | 800 | 32 | 1 | 32 |
| 25 | 25 | 5 | 400 | 32 | 7 | 224 |
| 25 | 25 | 5 | 200 | 32 | 7 | 224 |
| 25 | 25 | 5 | 100 | 32 | 12 | 384 |

The sampling and digitization of audio signals (e.g., by the microphones 104, 106, and 108) requires a specific amount of time. Generation of larger bit-width samples may take a longer time and produce larger packets, and generation of smaller bit-width samples a shorter time and produce smaller packets. In an example of the ANC system 100 that includes both larger and smaller samples, latency may be divided into two groups. A first group may feature lower latency based on transmitting a packet every cycle frame 122, as defined by the cycle start packet 130. A second group may feature higher latency, and transmit a packet every other cycle frame 122 (e.g., transmit in only even cycles or only in odd cycles). The packets of the first group may be smaller, and the packets of the second group may be larger.

FIG. 6 is a table of example channel count and latency values for mixed latency with two audio streams using the serial bus control circuit 120 in an example of the ANC system 100. In FIG. 6, the example network A includes 28 channels at 30 μs latency and 64 channels at 55 μs latency. The example network B includes 48 channels at 30 μs latency and 32 channels at 55 μs latency. The example network C includes 12 channels at 30 μs latency and 128 channels at 55 μs latency. The example network D includes 16 channels at 30 μs latency and 64 channels at 55 μs latency. These are examples and in the ANC system 100, with the isochronous cycle timer 306 (a programmable cycle timer), the ANC system 100 can be configured to support an audio network with a mix of device types. The total number of available channels may be allocated based on latency requirements.

FIG. 7 is a table of example network configurations illustrating use of packet concatenation using the serial bus control circuit 120 in an example of the ANC system 100. FIG. 7 illustrates four network configurations with various sample rates and cycle timer values, bus speeds and latency values. With high sample rates, the resulting packet duration may be less than the cycle time generated by the cycle timer 306. To ensure all samples packets are sent across the bus, the serial bus control circuit 120 (e.g., the transmitter 302) may buffer and concatenate packets so that no packets are lost. In example network A, the cycle time produced by the isochronous cycle timer 306 is 25 μs, which is longer than the duration of the sampled packet (~5.21 μs). In network A, the serial bus control circuit 120 concatenates 4 sampled packets for transmission in the same cycle, otherwise 3 of the sampled packets will be lost. The resulting latency of the packet is ~30 μs. In example network B, the cycle time produced by the isochronous cycle timer 306 is 25 μs, which is longer than the duration of the sampled packet (~10.417 μs). In network B, the serial bus control circuit 120 concatenates 2 sampled packets for transmission in the same cycle, otherwise 1 of the sampled packets will be lost. The resulting latency of the packet is ~30 μs. In example network C, the cycle time produced by the isochronous cycle timer 306 is 25 μs, which is longer than the duration of the sampled packet (~2.6 μs). In network C, the serial bus control circuit 120 concatenates 9 sampled packets for transmission in the same cycle, otherwise 8 of the sampled packets will be lost. In example network D, the cycle time produced by the isochronous cycle timer 306 is 25/μs, and the duration of the sampled packet (~20.8 μs). In network D, the serial bus control circuit 120 may transmit one sample packet per cycle.

In the examples of FIG. 7, the serial bus control circuit 120 waits and concatenates packets until the cycle timer matches the duration of sampled packet(s). This allows all packets to be transmitted with minimum latency.

Figure 8:
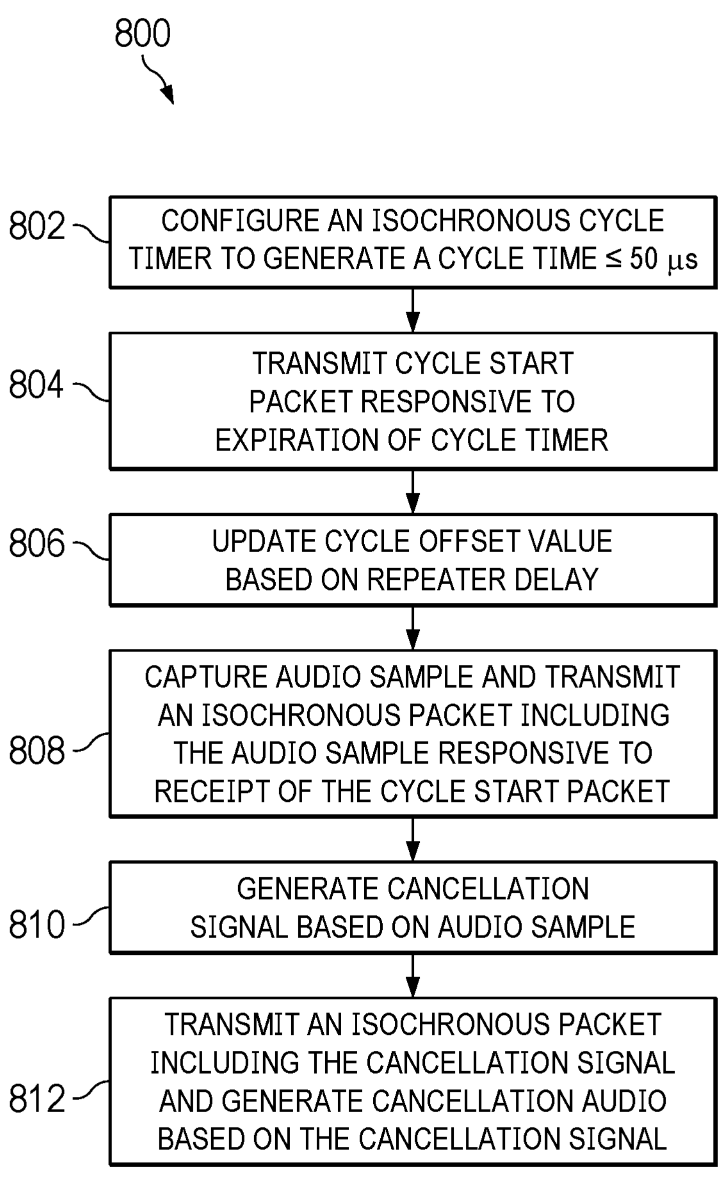
FIG. 8 is a flow diagram of an example method of ANC in the ANC system of FIG. 1.

FIG. 8 is a flow diagram of a method 800 for ANC using the serial bus control circuit 120 and the serial bus 118. Though depicted sequentially as a matter of convenience, at least some of the actions shown can be performed in a different order and/or performed in parallel. Additionally, some implementations may perform only some of the actions shown.

In block 802, the isochronous cycle timer 306 is configured to generate a cycle time that is no longer than 50 μs. The cycle time defines the duration of the cycle frame 122, which sets, in large part, the latency of the ANC system 100. For example, the isochronous cycle timer 306 may be configured to provide a frame duration of 50 μs, 25 μs, 20 μs, etc.

In block 804, the isochronous cycle timer 306 is running, and with each expiration of the isochronous cycle timer 306 (e.g., each time the low-order 12 bits of the isochronous cycle timer 306 equals zero), the serial bus control circuit 120 of the ANC controller 102 transmits a cycle start packet 130 via the serial bus 118. The cycle start packet 130 defines the start of the cycle frame 122.

In block 806, a physical layer control circuit 204 receives and repeats the cycle start packet 130. As part of the process of repeating the cycle start packet 130, the physical layer control circuit 204 updates a cycle offset field of the cycle start packet 130 based on a propagation delay through the physical layer control circuit 204. For example, the physical layer control circuit 204 may add a value representing the propagation delay through the physical layer control circuit 204 to the value received in the cycle offset field of the cycle start packet 130.

In some examples of the method 800, the physical layer control circuit 204 may concatenate multiple isochronous packets (each including one or more audio samples), and transmit the concatenated packets in the cycle frame 122.

In block 808, a node of the ANC system 100 (e.g., the microphone 104) captures audio signal and digitizes the audio signal to produce an audio sample. The physical layer control circuit 204 generates an isochronous packet including the audio sample, and responsive to receipt of the cycle start packet 130, the microphone 104 transmits the isochronous packet including the audio sample in the cycle frame 122.

The isochronous packet may be an example of the isochronous data packet 500 and include a relatively small header (e.g., no more than 8 header bytes). The header may include a 4-bit data length field encoding a packet payload length in octets, a 13-bit offset field, and a 4-bit format field.

In some examples of the method 800, the physical layer control circuit 204 may concatenate multiple isochronous packets (each including one or more audio samples), and transmit the concatenated packets in the cycle frame 122.

In block 810, the ANC controller 102 receives the audio sample transmitted by the microphone 104 and generates a cancellation signal based on the received audio sample.

In block 812, the ANC controller 102 transmits an isochronous packet including the cancellation signal via the serial bus 118. The speaker 110 receives the isochronous packet including the cancellation signal and generates cancellation audio based on the cancellation signal.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "ON" or "enabled" means that the conduction channel of the FET is present and drain current may flow through the FET. References herein to a FET being "OFF" or "disabled" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A serial bus control circuit comprising:
- a link layer control circuit configured to:
  - control isochronous data transfer over a serial bus, the link layer control circuit including:
    - an isochronous cycle timer configured to provide a cycle frame that is less than 125 microseconds in duration; and
  - generate an isochronous packet for transfer in the cycle frame, the isochronous packet including no more than eight header bytes, including:
    - a 4-bit data length field encoding a packet payload length in octlets;
    - a 12-bit time offset field;
    - a 4-bit format field; and
    - a 4-byte header check field.

2. The serial bus control circuit of claim 1, wherein the link layer control circuit is configured to set the isochronous cycle timer to provide a cycle frame duration that produces an isochronous transfer latency of no more than 50 microseconds.

3. The serial bus control circuit of claim 1, wherein the link layer control circuit is configured to provide a cycle frame that is no more than 25 microseconds in duration.

4. The serial bus control circuit of claim 1, wherein the link layer control circuit includes a transmitter configured to concatenate multiple isochronous packets for transmission in the cycle frame.

5. The serial bus control circuit of claim 1, further comprising:
- a physical layer control circuit coupled to the link layer control circuit;
- wherein:
  - the link layer control circuit is configured to:
    - generate a cycle start packet including:

a cycles/8000 field;

a cycle count field; and a cycle offset field;

transmit the cycle start packet to start the cycle frame; and the physical layer control circuit is configured to add a repeater delay value to a cycle offset value stored in the cycle offset field of the cycle of a received cycle start packet.

6. A method, comprising:

setting an isochronous cycle timer to provide a cycle frame that is no more than 50 microseconds in duration;

generating an isochronous packet;

transmitting the isochronous packet in the cycle frame;

transmitting a cycle start packet responsive to expiration of the isochronous cycle timer, wherein the cycle start packet includes:

a cycles/8000 field;

a cycle count field; and a cycle offset field; and adding, in a physical layer control circuit, a repeater delay value to a cycle offset value.

7. The method of claim 6, further comprising setting the isochronous cycle timer to provide a cycle frame duration that is no more than 25 microseconds in duration.

8. The method of claim 6, wherein generating the isochronous packet includes providing, in the isochronous packet, a header including no more than eight bytes.

9. The method of claim 8, further comprising including in the header:

a 4-bit data length field encoding a packet payload length in octlets;

a 12-bit time offset field;

a 4-bit format field; and a 4-byte header check field.

10. The method of claim 6, further comprising:

concatenating multiple isochronous packets for transmission in the cycle frame; and transmitting the concatenated packets in the cycle frame.

11. An active noise cancellation (ANC) system, comprising:

a microphone wherein the microphone converts a first group of sound waves into a first audio digital signal;

a speaker wherein the speaker receives a second audio digital signal and converts the second audio digital signal into a second group of sound waves; and an ANC controller coupled to the microphone and the speaker by a serial bus, in which the ANC controller includes a link layer control circuit configured to control isochronous data transfer between the ANC controller, the microphone, and the speaker over the serial bus, and the link layer control circuit includes an isochronous cycle timer configured to provide a cycle frame that is less than 125 microseconds in duration;

wherein the link layer control circuit is configured to generate an isochronous packet for transfer in the cycle frame, the isochronous packet including no more than eight header bytes, the header bytes including:

a 4-bit data length field encoding a packet payload length in octlets;

a 12-bit time offset field;

a 4-bit format field; and a 4-byte header check field.

12. The ANC system of claim 11, wherein the link layer control circuit is configured to set the isochronous cycle timer to provide a cycle frame duration that produces an isochronous transfer latency of no more than 50 microseconds.

13. The ANC system of claim 11, wherein the link layer control circuit is configured to concatenate multiple isochronous packets for transmission in the cycle frame.

14. The ANC system of claim 11, wherein:

the link layer control circuit is configured to:

generate a cycle start packet including:

a cycles/8000 field;

a cycle count field; and a cycle offset field;

transmit the cycle start packet to start the cycle frame; and the ANC controller includes a physical layer control circuit coupled to the link layer control circuit, the physical layer control circuit configured to add a repeater delay value to a cycle offset value stored in the cycle offset field of the cycle of a received cycle start packet.

15. A serial bus control circuit comprising:

a link layer control circuit configured to control isochronous data transfer over a serial bus, the link layer control circuit including:

an isochronous cycle timer configured to provide a cycle frame that is less than 125 microseconds in duration;

a physical layer control circuit coupled to the link layer control circuit;

wherein:

the link layer control circuit is configured to:

generate a cycle start packet including:

a cycles/8000 field;

a cycle count field; and a cycle offset field;

transmit the cycle start packet to start the cycle frame; and the physical layer control circuit is configured to add a repeater delay value to a cycle offset value stored in the cycle offset field of the cycle of a received cycle start packet.

16. The serial bus control circuit of claim 15, wherein the link layer control circuit is configured to set the isochronous cycle timer to provide a cycle frame duration that produces an isochronous transfer latency of no more than 50 microseconds.

17. The serial bus control circuit of claim 15, wherein the link layer control circuit is configured to provide a cycle frame that is no more than 25 microseconds in duration.

18. The serial bus control circuit of claim 15, wherein the link layer control circuit includes a transmitter configured to concatenate multiple isochronous packets for transmission in the cycle frame.

19. A method, comprising:

setting an isochronous cycle timer to provide a cycle frame that is no more than 50 microseconds in duration;

generating an isochronous packet having a header including no more than eight bytes, the header including:

a 4-bit data length field encoding a packet payload length in octlets;

a 12-bit time offset field;

a 4-bit format field; and a 4-byte header check field; and transmitting the isochronous packet in the cycle frame.

20. The method of claim 19, further comprising setting the isochronous cycle timer to provide a cycle frame duration that is no more than 25 microseconds in duration.

21. The method of claim 19, further comprising:

concatenating multiple isochronous packets for transmission in the cycle frame; and transmitting the concatenated packets in the cycle frame.

22. An active noise cancellation (ANC) system, comprising:

a microphone wherein the microphone converts a first group of sound waves into a first audio digital signal;

a speaker wherein the speaker receives a second audio digital signal and converts the second audio signal into a second group of sound waves; and an ANC controller coupled to the microphone and the speaker by a serial bus, in which the ANC controller includes a link layer control circuit configured to:

control isochronous data transfer between the ANC controller, the microphone, and the speaker over the serial bus, and generate a cycle start packet including:

a cycles/8000 field;

a cycle count field; and a cycle offset fields; and wherein the link layer control circuit includes an isochronous cycle timer configured to provide a cycle frame that is less than 125 microseconds in duration.

23. The ANC system of claim 22, wherein the link layer control circuit is configured to set the isochronous cycle timer to provide a cycle frame duration that produces an isochronous transfer latency of no more than 50 microseconds.

24. The ANC system of claim 22, wherein the link layer control circuit includes a transmitter configured to generate an isochronous packet for transfer in the cycle frame, the isochronous packet including no more than eight header bytes.

25. The ANC system of claim 24, wherein the transmitter is configured to concatenate multiple isochronous packets for transmission in the cycle frame.

* * * * *